United States Patent [19]

Drutchas et al.

[11] Patent Number: 4,550,597
[45] Date of Patent: Nov. 5, 1985

[54] METHOD AND APPARATUS FOR SENSING RELATIVE MOVEMENT BETWEEN MEMBERS

[75] Inventors: Gilbert H. Drutchas, Birmingham; John S. Borza, Sterling Heights, both of Mich.

[73] Assignee: TRW Inc., Cleveland, Ohio

[21] Appl. No.: 596,655

[22] Filed: Apr. 4, 1984

[51] Int. Cl.⁴ .............................................. G01R 33/06
[52] U.S. Cl. ....................................... 73/118; 73/1 E; 324/208; 180/79.1
[58] Field of Search .................... 73/118, 1 E, DIG. 3; 324/208, 173, 174; 310/46, 168, DIG. 3; 318/254; 180/79.1

[56] References Cited

U.S. PATENT DOCUMENTS 4,029,180  6/1977  Gee ...................................... 324/174
4,364,011 12/1982  Bloomfield et al. ................. 324/174
4,415,054 11/1983  Drutchas ............................. 180/79.1

Primary Examiner—Stephen A. Kreitman
Attorney, Agent, or Firm—Yount & Tarolli

[57] ABSTRACT

An improved method and apparatus for sensing relative movement between a pair of members includes a pair of parts which cooperate to provide an electrical signal upon relative movement between the members. One of these parts may be a Hall effect device and the other part may be a pair of magnets. In order to accurately position the Hall effect device and the magnets relative to each, they are mounted on a substrate or base. The portion of the substrate upon which the magnets are disposed is connected with one of the members. The Hall effect device is disposed on a portion of the substrate which is connected with the other member. Once the substrate has been connected with the two members, it is separated to enable the members to be easily moved relative to each other.

19 Claims, 9 Drawing Figures

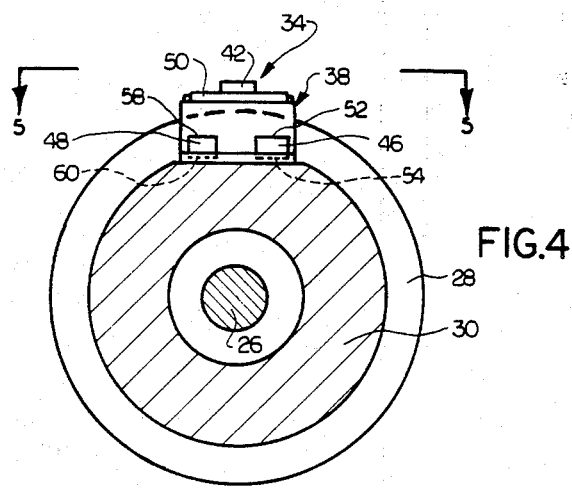
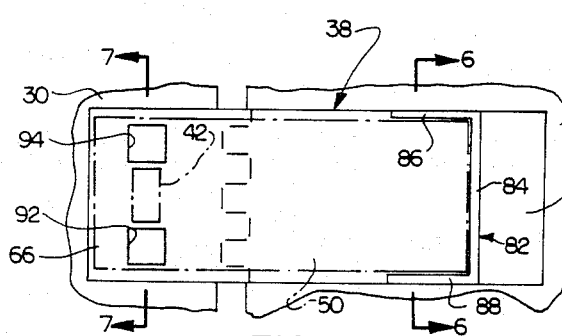
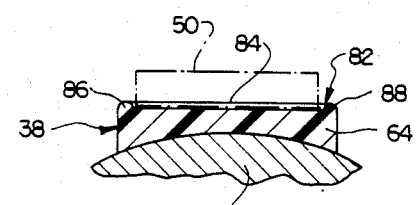
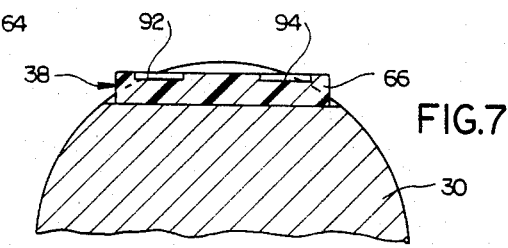
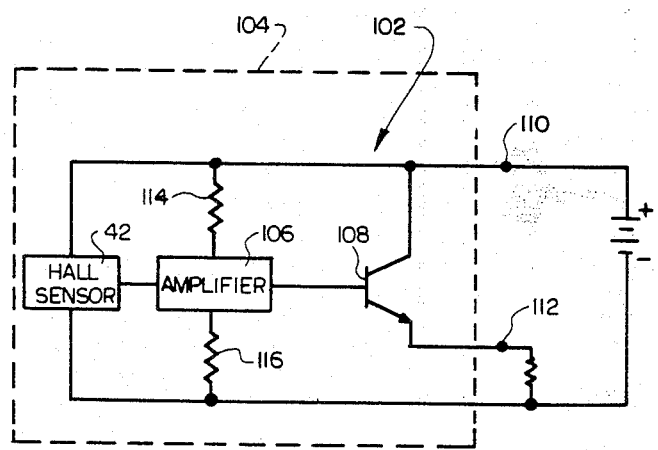
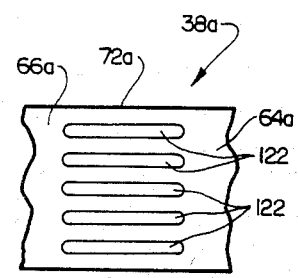

METHOD AND APPARATUS FOR SENSING RELATIVE MOVEMENT BETWEEN MEMBERS

BACKGROUND OF THE INVENTION

The present invention relates to a new and improved apparatus for sensing relative movement between a pair of members.

A Hall effect device and a pair of magnets have been used to detect relative movement between a pair of members. The Hall effect device has been connected with one of the members for movement therewith relative to the magnets which are connected with the other member. Upon relative movement between the two members, the Hall effect device cooperates with the magnets to create an electrical signal in a known manner.

Although the electrical signal provided by the interaction between the magnets and a Hall effect device has been widely used in many different environments to detect relative movement between a pair of members, difficulty has been encountered in accurately positioning the Hall effect device and magnets relative to each other in a neutral or initial position. If the Hall effect device and magnets are not initially positioned accurately relatively to each other, the Hall effect device will provide an output signal indicative of relative movement between the members when such movement has not occurred.

The concept of using a Hall effect device and a pair of magnets to detect initiation of a power steering operation is disclosed in U.S. Pat. No. 4,415,054. The power steering apparatus disclosed in this patent includes a steering column having an upper shaft which is rotated upon rotation of a steering wheel. Torque is transmitted from the upper shaft to a lower shaft by a torsion bar between the two shafts. The lower shaft is connected with the pinion of a rack and pinion steering gear.

Upon initiation of a steering operation with the apparatus disclosed in U.S. Pat. No. 4,415,054, the torsion bar is twisted and a Hall effect device mounted on the upper shaft is moved relative to the pair of magnets on the lower shaft. When the Hall effect device is moved relative to the magnets, a control signal is created which is delivered to an electronic control unit. The control signal indicates the amount of relative movement between the two shafts and the direction of this relative movement. If the magnets and Hall effect device of the apparatus disclosed in U.S. Pat. No. 4,415,054 are not initially positioned accurately relative to each other, an output signal indicating relative movement between the shafts is created prior to rotation of the steering wheel.

SUMMARY OF THE PRESENT INVENTION

The present invention provides a new and improved method and apparatus for sensing relative movement between a pair of members. The apparatus includes a substrate or base which is used to accurately locate parts which create an electrical signal upon relative movement between the parts.

More specifically, the substrate or base includes two parts which are attached together. A Hall effect device is accurately mounted on one part and magnets are accurately mounted on the other part. One part is attached to one member and the other part is attached to another member. The parts after being attached to the members are separated so that the magnets and Hall effect device move relative to each other upon relative movement of the members.

In one specific embodiment of the invention, a Hall effect device is accurately positioned on one end portion of a substrate and a pair of magnets are accurately positioned on the other end portion of the substrate. The end portion of the substrate upon which the Hall effect device is mounted is connected with one member of a pair of relatively movable members. The end portion of the substrate upon which the magnets are mounted is connected with the other member. After this has been done, the two portions of the substrate are separated. Although it is contemplated that the method and apparatus of the present invention may be used in many different environments, it is preferred to use the apparatus in a steering assembly to detect initiation of a steering operation.

Accordingly, it is an object of this invention to provide a new and improved method and apparatus for sensing relative movement between a pair of members and wherein parts for creating an electrical signal are positioned on separable portions of a substrate which portions are connectable with the respective members.

BRIEF DESCRIPTION OF THE DRAWINGS

The foregoing and other objects and features of the present invention will become more apparent to one skilled in the art upon consideration of the following description taken in connection with the accompanying drawings wherein:

FIG. 4 is a fragmentary sectional view, taken generally along the line 4—4 of FIG. 2, further illustrating the relationship between the sensor assembly and the relatively movable members;

FIG. 5 is a top plan view, taken generally along the line 5—5 of FIG. 4, further illustrating the construction of the substrate;

FIG. 6 is a fragmentary sectional view, taken generally along the line 6—6 of FIG. 5, illustrating the relationship between the substrate and one of the relatively movable members;

FIG. 7 is a fragmentary sectional view, taken generally along the line 7—7 of FIG. 5, illustrating the relationship between the substrate and a second one of the relatively movable members;

FIG. 8 is a schematic illustration of circuitry used in association with the sensor assembly of FIGS. 2-4; and FIG. 9 is a fragmentary top plan view of a second embodiment of the substrate.

DESCRIPTION OF SPECIFIC PREFERRED EMBODIMENTS OF THE INVENTION

Figure 1:
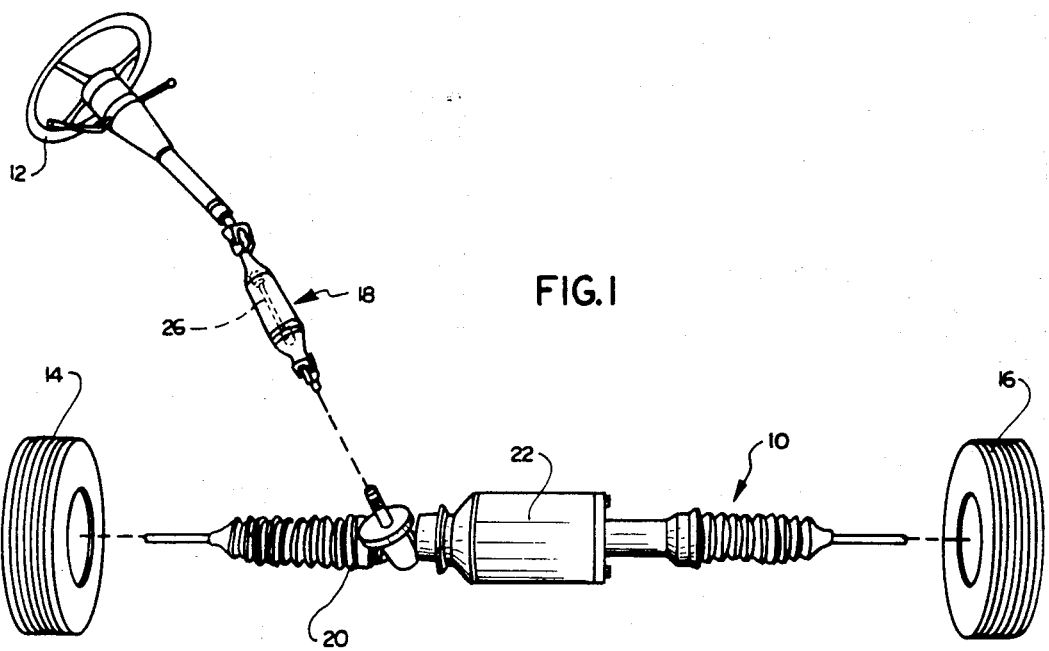
FIG. 1 is a schematic illustration of a steering apparatus in which a sensor assembly constructed in accordance with the present invention is used to sense relative movement between a pair of members upon initiation of a steering operation.

A steering apparatus 10 (FIG. 1) is operable, upon manual rotation of a steering wheel 12, to turn steerable vehicle wheels 14 and 16. Upon rotation of the steering wheel 12, a control assembly 18 provides an electrical signal indicating the direction in which the steering wheel is rotated and the amount of force applied to the steering wheel. This output signal effects energization of an electric motor 22 which is operable to assist in effecting actuation of the rack and pinion steering gear 20 to turn the steerable vehicle wheels. The construction of the electric motor 22 and the manner in which it interacts with the rack and pinion steering gear 20 is the same as is described in U.S. Pat. No. 4,415,054.

Figure 2:
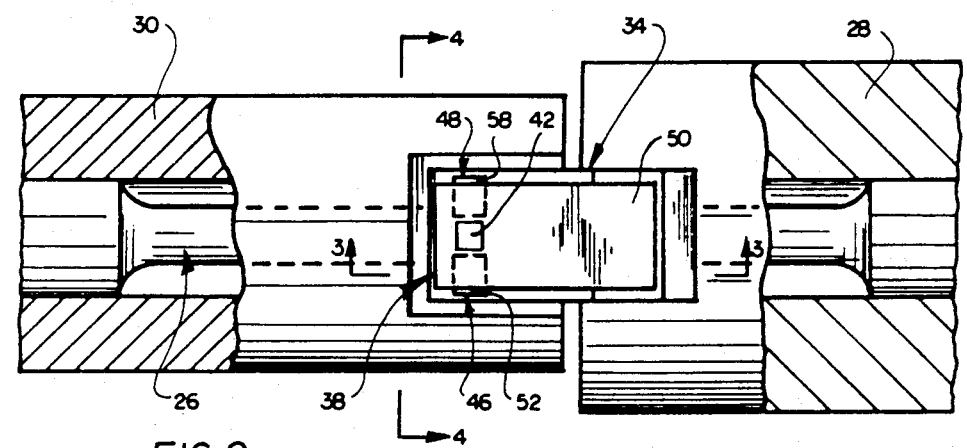
FIG. 2 is an enlarged fragmentary view illustrating the relationship between the sensor assembly and the members which are moved relative to each other upon initiation of a steering operation.

The control assembly 18 includes a torsion bar 26 (FIG. 2) which interconnects an upper coupling member 28 and a lower coupling member 30. The upper coupling member 28 is connected with the steering wheel 12 and is rotated therewith upon initiation of a steering operation. The lower coupling member 30 is connected with the rack and pinion steering gear 20. During a steering operation, torque is transmitted from the upper coupling member 28 through the torsion bar 26 to the lower coupling member 30 and the pinion gear of the rack and pinion steering gear 20 in a known manner.

Upon initiation of a steering operation, the torque applied to the torsion bar 26 by the upper coupling member 28 twists the torsion bar so that the upper coupling member 28 rotates relative to the lower coupling member 30. This relative movement between the upper and lower coupling members 28 and 30 is detected by a sensor assembly 34 (FIGS. 2–4) constructed in accordance with the present invention. Thus, upon the occurrence of relative movement between the coupling members 28 and 30, the sensor assembly 34 provides an electrical signal which effects operation of the motor 22 to assist in turning the steerable vehicle wheels 14 and 16. Although the sensor assembly 34 has been disclosed herein as detecting relative movement between the coupling members 28 and 30 of the steering apparatus 10, it is contemplated that the sensor assembly 34 could be used in many other environments to detect relative movement between many different types of members.

Figure 3:
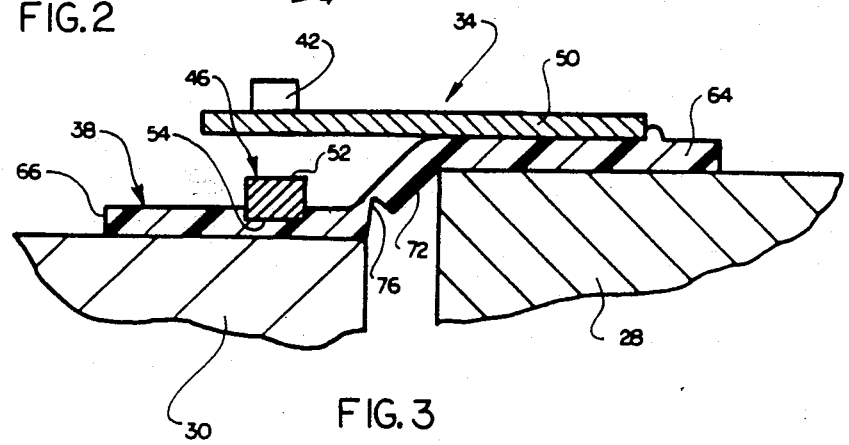
FIG. 3 is an enlarged fragmentary sectional view, taken generally along the line 3—3 of FIG. 2, illustrating the relationship between a substrate of the sensor assembly and the pair of relatively movable members prior to separating of portions of the substrate.

The sensor assembly 34 includes a rectangular base or substrate 38 (see FIGS. 3 and 5). Although other known devices could be used to create an electrical signal, in the illustrated embodiment of the invention, a Hall effect device 42 cooperates with a pair of magnets 46 and 48 (FIGS. 2 and 4) to create an electrical signal upon relative rotation between the coupling members 28 and 30. The Hall effect device is connected with the substrate 38 by a rigid ceramic support plate 50 (FIG. 3).

The magnets 46 and 48 have opposite poles oriented toward the Hall effect device 42. Thus, a north pole end face 52 of the magnet 46 (FIG. 2) is oriented toward the Hall effect device 42 and a south pole end face 54 of the magnet 46 is oriented away from the Hall effect device 42. Similarly, a south pole end face 58 of the magnet 48 is oriented toward the Hall effect device 42 and a north pole end face 60 of the magnet 48 is oriented away from the Hall effect device 42. Of course, the polar positions of the magnets 46 and 48 could be reversed if desired.

In accordance with a feature of the present invention, the Hall effect device 42 is precisely aligned with the magnets 46 and 48 before the substrate 38 is connected with the upper and lower coupling shafts 28 and 30. Thus, the support plate 50 (FIG. 3) and Hall effect device 42 are secured to an end portion 64 of the substrate 38 by a suitable adhesive. The magnets 46 and 48 are secured to an end portion 66 of the substrate by a suitable adhesive.

By mounting the Hall effect device 42 and magnets 46 and 48 on the substrate before the substrate is connected with the coupling members 28 and 32, precise positioning of the magnets and Hall effect device relative to each other is facilitated. If the magnets 46 and 48 were mounted directly on the lower coupling member 30 and the Hall effect device 42 was mounted on the upper coupling member 28, it would be very difficult to precisely position the magnets and Hall effect device relative to each other with the torsion bar 26 in an unstressed or neutral condition.

When the sensor assembly 34 is to be installed in the steering apparatus 10, the end portion 64 of the substrate 38 is fixedly connected with the relatively large diameter coupling member 28 (FIG. 3). The end portion 66 of the substrate 38 is fixedly connected with the relatively small diameter coupling member 30. An intermediate portion 72 of the substrate 38 spans the space of the ends of the coupling members 28 and 30.

Once the substrate 38 has been connected with the coupling members 28 and 30 by a suitable adhesive and/or mechanical fasteners, the two end portions 64 and 66 of the substrate are separated, that is they are disconnected or set apart, by severing an intermediate portion 72 of the substrate 38. To facilitate severing the substrate 38, the intermediate portion 72 of the substrate is weakened by a groove or indentation 76 (see FIG. 3). The linear groove or indentation 76 extends across the width of the substrate 38.

The substrate 38 may be severed by either cutting the substrate along the groove 76 or rupturing the material of the substrate at the groove. Thus, a laser could be used to cut the substrate at the groove 76 or the coupling members 28 and 30 could be twisted relative to each other to rupture the material of the substrate at the groove. After the end portions 64 and 66 of the substrate have been separated from the intermediate portion 72, the Hall effect device 42 is free to move with the upper coupling member 28 and the magnets 46 and 48 are free to move with the lower coupling member 30 upon relative rotation between the two coupling members and twisting of the torsion bar 26.

When the steering apparatus 10 is in an unactuated condition and the torsion bar 26 has not been twisted, the Hall effect device 42 is precisely positioned exactly midway between the two magnets 46 and 48 at the same vertical height from both of the magnets. This results in offsetting magnetic fields being applied to the Hall effect device 42 by the two magnets 46 and 48 so that the Hall effect device does not create an electrical output signal.

If the magnets 46 and 48 and Hall effect device 42 are not precisely positioned relative to each other, the Hall effect device will provide an electrical control signal when the steering apparatus 10 is in a neutral or unactuated condition. This false control signal would result in energization of the electric motor 22 in an effort to correct for the inaccurate initial positioning of the Hall effect device and/or magnets. By precisely positioning the magnets 46 and 48 and Hall effect device 42 on the substrate 38 and then connecting the end portions 64 and 66 of the substrate with the coupling shafts 28 and 30 when they are in a neutral position, the possibility of a false neutral position control signal is minimized.

Due to the difference in diameters of the coupling members 28 and 30, the end portion 64 of the substrate is disposed at a different distance from the axis of rotation of the coupling members than the end portion 66 of the substrate. The support member 50 extends outwardly from the large diameter upper coupling member 28 over the small diameter coupling member 30 to support the Hall effect device 42 adjacent to the magnets 46 and 48 (FIGS. 3 and 4). Since the support member positions the Hall effect device 42 midway between the magnets 46 and 48, variations in the diameters of the coupling members 28 and 30, within normal manufacturing tolerance ranges, does not cause the Hall effect device to create an output signal.

In order to facilitate mounting the substrate 38 on the coupling shafts 28 and 30, the intermediate portion 72 of the substrate can be flexed toward and away from the axis of rotation of the coupling members 28 and 30. However, the intermediate portion 72 of the substrate 38 is not flexible in a transverse direction, that is in a direction perpendicular to the axis of rotation of the coupling members 28 and 30. This enables the substrate 38 to be flexed as it is installed on the coupling shafts 28 and 30 while maintaining the Hall effect device 42 centered relative to the magnets 46 and 48. Of course, if desired, the substrate 38 could be molded to a rigid configuration corresponding to the exact configuration of the environment in which it is to be mounted.

In order to facilitate mounting the Hall effect device 42 and magnets 46 and 48 on the substrate 38, the substrate is provided with surfaces which locate the Hall effect device and magnets relative to each other. Thus, the end portion 64 of the substrate 38 has a rib 82 (see FIGS. 5 and 6) which engages the support plate 50 to position the Hall effect device 42 relative to the substrate 38. The rib 82 includes a base or end section 84 which engages one end of the support plate 50 to position the Hall effect device 42 along the longitudinal axis of the substrate 38. In addition, the rib 82 has a pair of side sections 86 and 88 which engage opposite longitudinally extending sides of the support plate 50 to position the Hall effect device 42 transversely relative to the substrate 38.

In order to locate the magnets 46 and 48 relative to the substrate 38, the substrate is provided with a pair of recesses 92 and 94 (see FIGS. 5 and 7). The recesses 92 and 94 each have a rectangular configuration which corresponds to the rectangular configuration of the magnets 46 and 48. This enables the vertically extending (as viewed in FIG. 7) side surfaces of the recesses 92 and 94 to engage the side surfaces of the magnets 46 and 48 to accurately position the magnets relative to the Hall effect device 42.

The substrate 38 is molded of suitable polymeric material. When the one-piece substrate 38 is being formed, the rib 82 and recesses 92 and 94 can be readily molded into the substrate in an accurate position relative to each other. The support plate 44 can then be accurately positioned relative to the recesses 92 and 94 by the rib 82 as it is secured to the substrate 38 with a suitable adhesive. Similarly, the magnets 46 and 48 are accurately located relative to the substrate 38 as they are positioned in the recesses 92 and 94 and connected with the substrate by a suitable adhesive. If desired, the groove 76 (see FIG. 3) can be formed in the substrate as it is molded rather than being cut into the substrate after the molding process.

In the illustrated embodiment of the invention, the end portion 64 of the substrate 38 is molded with an arcuate inner side surface which matches the configuration of a cylindrical outer side surface of the upper coupling member 28 to which the end portion 64 of the substrate is bonded (see FIG. 6). Similarly, the end portion 66 of the substrate 38 is formed with a flat inner side surface which corresponds to the configuration of a flat surface formed on the lower coupling member 30 to which the substrate 38 is bonded.

The Hall effect device 42 is connected with an electrical circuit 102 (FIG. 8) which can be disposed on a single silicon chip 104. In addition to the Hall effect device 42, the circuit 102 includes a linear amplifier 106 and an output transistor 108. The output from the Hall effect device is conducted from terminals 110 and 112 to control circuitry for the electric motor 22.

Although the Hall effect device 42 and magnets 46 and 48 are positioned relative to each other by the substrate 38, it is contemplated that under commercially feasible production conditions there may be a slight error in the position of the Hall effect device 42 relative to the magnets 46 and 48. In order to prevent a false initial or neutral signal before actuation of the steering apparatus 10 due to even a very slight error in the positioning of the Hall effect device 42 and magnets 46 and 48, a pair of resistors 114 and 116 are associated with the amplifier 106. By reducing the magnitude of one of the resistors 114 or 116 relative to the other resistor, compensation can be obtained for small errors in the positioning of the Hall effect device 42 and magnets 46 and 48 relative to each other. To facilitate adjustment of the resistors 114 and 116, they may be of the thin-film resistor-ladder type which can be laser trimmed.

In the embodiment of the invention shown in FIGS. 1–7, the intermediate portion 72 of the substrate 38 is weakened by forming the linear groove 76 across the substrate. However, it is contemplated that the intermediate portion 72 of the substrate could be weakened in many different ways, including forming of perforations in the substrate. In the embodiment of the invention illustrated in FIG. 9, the intermediate portion of the substrate is weakened by the formation of a plurality of elongated openings in the intermediate portion of the substrate. Since the embodiment of the invention shown in FIG. 9 is generally similar to the embodiment of the invention shown in FIGS. 1–7, similar numerals will be utilized to indicate similar components, the suffix letter "a" being associated with the embodiment of the invention shown in FIG. 9 to avoid confusion.

In the embodiment of the invention shown in FIG. 9, the substrate 38a has an intermediate portion 72a which is located between an end portion 64a upon which the support plate for a Hall effect device is mounted and an end portion 66a upon which a pair of magnets are mounted. In accordance with a feature of this embodiment of the invention, the intermediate portion 72a of the substrate 38a is weakened by a plurality of longitudinally extending openings 122 in the central portion 72a of the substrate 38a. The openings 122 enable the portions 64a and 66a to be readily separated once the substrate has been mounted on upper and lower coupling members in the manner previously explained in connection with the embodiment of the invention shown in FIGS. 1–7.

In view of the foregoing it is apparent that the present invention provides a new and improved sensor assembly 34 for sensing relative movement between a pair of members 28 and 30. The sensor assembly 34 includes a substrate or base 38 which is used to accurately locate parts 42, 46 and 48 which create an electrical signal upon relative movement between the parts.

The substrate or base includes two parts which are attached together. The Hall effect device is mounted on one part and the magnets are mounted on the other part. After the parts of the substrate or base are secured to the members 28, 30, the parts of the substrate or base are separated so that the magnets and Hall effect device can move relative to each other.

In one specific embodiment of the invention, a Hall effect device 42 is accurately positioned on one end portion 64 of the substrate 38 and a pair of magnets 46 and 48 are accurately positioned on the other end portion 66 of the substrate. The end portion 64 of the substrate 38 upon which the Hall effect device 42 is mounted is connected with one member 28 of a pair of relatively movable members. The end portion 66 of the substrate upon which the magnets 46 and 48 are mounted is connected with the other member 30. After this has been done, the two portions 66 and 68 of the substrate 38 are separated. Although it is contemplated that the method and apparatus of the present invention may be used in many different environments, it is preferred to use the apparatus in a steering assembly 10 to detect initiation of a steering operation.

Having described specific preferred embodiments of the invention, the following is claimed:

1. Apparatus for sensing relative rotational movement between two members, said apparatus comprising:
   a first part for movement with one member,
   a second part for movement with the other member, said first and second parts having means for creating an electrical signal upon relative movement thereof,
   a base having first and second portions, said first and second portions of said base being fixedly mountable on said respective members, said base having a third portion which is separable after said first and second portions are fixedly mounted on said first and second members to effect separation of said first and second portions.

2. An apparatus as set forth in claim 1 wherein said first part is a Hall effect device and said second part is a magnet, said Hall effect device being fixedly connected with said first portion and said magnet being fixedly connected with said second portion.

3. An apparatus as set forth in claim 1 wherein the two members are components of a steering system and are rotatable relative to each other upon actuation of the steering system, said first and second parts cooperating to generate an electrical signal upon actuation of the steering system and relative rotation between the two members.

4. An apparatus as set forth in claim 1 wherein said first portion includes first surface means for engaging said first part to position said first part relative to said first portion, said second portion includes second surface means for engaging said second part to position said second part relative to said second portion.

5. An apparatus as set forth in claim 1 wherein the members are of different cross sectional sizes, said third portion of said base being extendable between the members to span the distance between the outer side surfaces of the members.

6. An apparatus as set forth in claim 1 wherein said third portion includes surface means for reducing the effective cross sectional area of at least a portion of said third portion to facilitate separation of the first and second portions.

7. A sensor for sensing relative rotational movement between two members, said sensor including:
   a first part for movement with one member and a second part for movement with the other member, said parts creating an electrical signal upon relative movement,
   a substrate having first and second portions, said first and second portions being for mounting on said respective members, said substrate having an intermediate portion between said first and second portions and which is separable after said first and second portions are mounted on said first and second members.

8. A sensor as set forth in claim 7 wherein said first part is a Hall effect device and said second part is a magnet, said Hall effect device being fixedly connected with said first portion of said substrate, said magnet being fixedly connected with said second portion of said substrate.

9. A sensor as set forth in claim 7 wherein said intermediate portion of said substrate is flexible in a first direction relative to a longitudinal axis of said substrate and is substantially inflexible in a second direction relative to the longitudinal axis of said substrate to enable said substrate to position said first and second parts relative to members having different cross sectional sizes.

10. An apparatus as set forth in claim 9 wherein said first part includes a rigid support member and a Hall effect device, said support member having a first end portion fixedly connected with said first portion of said substrate and a second end portion, said Hall effect device being fixedly connected with said second end portion of said rigid support member.

11. A sensor as set forth in claim 7 wherein said intermediate portion of said substrate includes surface means for reducing the effective cross sectional area of at least a portion of said substrate to facilitate separation of the first and second portions of said substrate.

12. Apparatus comprising:
   first and second relatively rotatable members;
   a sensor for sensing relative rotation of said members, said sensor including;
      a first part movable with said first member,
      a second part movable with said second member,
      said first and second parts having structure for creating an electrical signal upon relative movement thereof,
   a substrate having first and second portions fixedly secured to said first and second relatively rotatable members, means securing said first and second parts to said respective first and second portions of said substrate; and said substrate including an intermediate portion which is separable after said first and second parts are secured to said respective first and second portions of said substrate and after said first and second portions of said substrate are secured to said first and second members, respectively.

13. An apparatus as set forth in claim 12 wherein said first part includes a Hall effect device which is connected with said first portion of said substrate, said second part including a magnet connected with said second portion of said substrate.

14. An apparatus as set forth in claim 12 wherein said first member has a first cross sectional area and said second member has a second cross sectional area which is less than said first cross sectional area, said intermediate portion of said substrate being flexible in a first direction to accommodate movement between said first and second portions of said substrate toward and away from the axes of rotation of said first and second members, said intermediate portion of said substrate being inflexible in a second direction transverse to said first direction to prevent movement between said first and second portions of said substrate in a direction transverse to the axes of rotation of said first and second members.

15. An apparatus as set forth in claim 12 wherein said first member has a first cross sectional area and said second member has a second cross sectional area which is less than said first cross sectional area, said first part including a support member having a first end portion which is fixedly connected with said first portion of said substrate and a second end portion which extends over said second portion of said substrate, said first part further including means disposed on said second end portion of said support member for cooperating with said second part to create an electrical signal upon relative rotation between said first and second members.

16. A method comprising the steps of:
providing first and second sensor parts which create an electrical signal upon relative rotation thereof,
mounting the first and second sensor parts on respective first and second portions of a substrate,
fixedly securing said first and second portions of said substrate to first and second members, and
thereafter separating said first and second portions of said substrate so that said first and second sensor parts move with said first and second members, respectively.

17. A method as set forth in claim 16 wherein said step of separating said first and second portions of said substrate includes the step of severing an intermediate portion of the substrate which is disposed between the first and second end portions of the substrate.

18. A method as set forth in claim 16 wherein said step of fixedly securing the first and second portions of said substrate to the first and second members includes mounting the first portion of the substrate on the first member at a location which is disposed at a first distance from the axis of rotation of the first member and mounting the second portion of the substrate on the second member at a location which is disposed at a second distance from the axis of rotation of the second member, said second distance being less than said first distance.

19. A method as set forth in claim 16 wherein said step of separating said first and second portions of said substrate includes the step of rupturing said substrate.

* * * * *